O. SCHÖNHERR & J. HESSBERGER.
PROCESS AND APPARATUS FOR THE PRODUCTION OF COMPOUNDS OF NITROGEN.
APPLICATION FILED FEB. 3, 1909.

1,032,782.

Patented July 16, 1912.

WITNESSES:
William Miller
Christian Almstaedt

INVENTORS
Otto Schönherr
Johannes Hessberger
BY
W. C. Hauff
ATTORNEY O. SCHÖNHERR & J. HESSBERGER.
PROCESS AND APPARATUS FOR THE PRODUCTION OF COMPOUNDS OF NITROGEN.
APPLICATION FILED FEB. 3, 1909.

1,032,782.

Patented July 16, 1912.

WITNESSES:
William Miller
Christian Almstaedt

INVENTORS
Otto Schönherr
Johannes Hessberger
BY
W. C. Hauff
ATTORNEY O. SCHÖNHERR & J. HESSBERGER.
PROCESS AND APPARATUS FOR THE PRODUCTION OF COMPOUNDS OF NITROGEN.
APPLICATION FILED FEB. 3, 1909.

1,032,782.

Patented July 16, 1912.

WITNESSES:
William Miller
Christian Almstaedt

INVENTORS
Otto Schönherr
Johannes Hessberger
BY
W. C. Hauff
ATTORNEY

O. SCHÖNHERR & J. HESSBERGER.
PROCESS AND APPARATUS FOR THE PRODUCTION OF COMPOUNDS OF NITROGEN.
APPLICATION FILED FEB. 3, 1909.

1,032,782.

Patented July 16, 1912
7 SHEETS—SHEET 6.

Fig. 7ª.

WITNESSES:
William Miller
Christian Almstaedt

INVENTORS
Otto Schönherr
Johannes Hessberger
BY
W. C. Hauff
ATTORNEY

O. SCHÖNHERR & J. HESSBERGER.
PROCESS AND APPARATUS FOR THE PRODUCTION OF COMPOUNDS OF NITROGEN.
APPLICATION FILED FEB. 3, 1909.

1,032,782.

Patented July 16, 1912.

WITNESSES:
William Miller
Christian Almstaedt

INVENTORS
Otto Schönherr
Johannes Hessberger
BY
W. C. Hauff
ATTORNEY

UNITED STATES PATENT OFFICE.

OTTO SCHÖNHERR AND JOHANNES HESSBERGER, OF FISKAA, NORWAY, ASSIGNORS TO BADISCHE ANILIN & SODA FABRIK, OF LUDWIGSHAFEN-ON-THE-RHINE, GERMANY.

PROCESS AND APPARATUS FOR THE PRODUCTION OF COMPOUNDS OF NITROGEN.

1,032,782.

Specification of Letters Patent. Patented July 16, 1912.

Application filed February 3, 1909. Serial No. 475,886.

*To all whom it may concern:*

Be it known that we, OTTO SCHÖNHERR, doctor of philosophy and chemist, and JOHANNES HESSBERGER, electrician, subjects, respectively of the King of Saxony and the King of Prussia, residing at Fiskaa, Norway, have invented new and useful Improvements in Processes and Apparatus for the Production of Compounds of Nitrogen, of which the following is a specification.

In the specification of Letters Patent No. 930,238, September 9th, 1909, we have described a process and apparatus for producing compounds of oxygen and nitrogen by means of long electric arcs. In the present application we set forth more specifically the features of apparatus and process for carrying out the said generic process and details in connection therewith.

Figure 1:
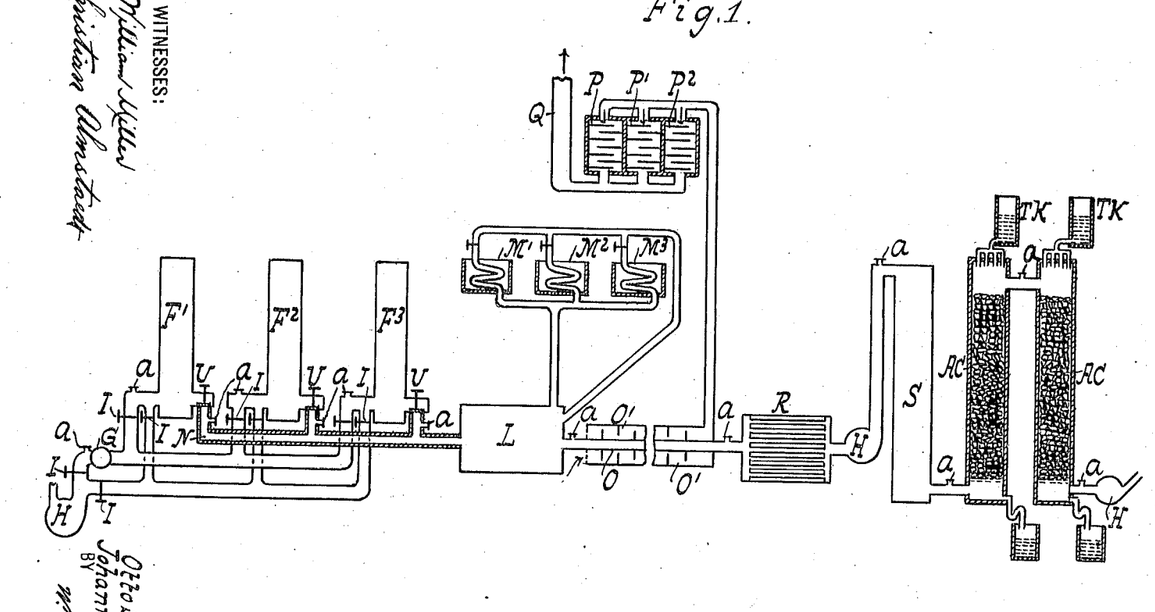
Figure 1 is a general plan showing how the air used in the process is supplied to the furnaces and the gases obtained therefrom are made to yield up their heat thereby performing useful work and also showing means for utilizing and absorbing the oxids of nitrogen formed.

In Fig. 1, H represents a fan which delivers air to the furnaces $F^1$, $F^2$, and $F^3$, the air being fed either directly to the furnaces, or passing through a gas meter G. I I represent valves or levers for the purpose of regulating the air current in the several tubes. U are valves at the exits of the furnaces and can be made, for instance, of steatite, or of metal cooled with water, as hereinafter described. N is a tube or passage lined with fire-proof material. L is a steam-boiler which is heated by means of the furnace gases. $M^1$, $M^2$, and $M^3$ are evaporating pans which are heated by steam-coils while the condensed water returns to the boiler. O is a tube through which the gases pass after leaving the boiler and around this tube is another tube $O'$. Air is passed between the two tubes thereby taking up heat and is then passed through the drying chambers P, $P^1$, and $P^2$, and subsequently to the chimney Q. R is a cooler made of tubes. S is an empty chamber where oxidation can take place. A C are absorption chambers fed with absorbing liquid from the tanks T K; H H are fans.

Figures 2, 3, 4:
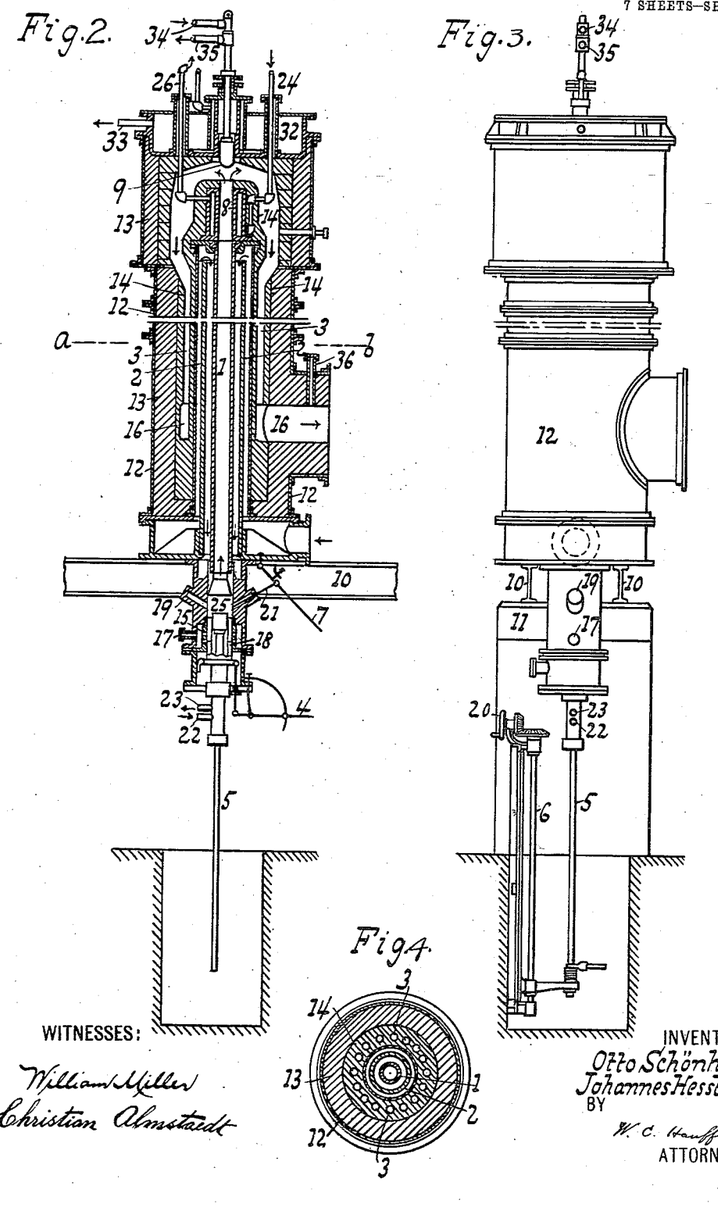
Figs. 2, 3, and 4 are more detailed drawings of one of the furnaces used, Fig. 2 being a vertical section, Fig. 3 an elevation, and Fig. 4 a cross-section along the line $a\ b$ of Fig. 2.

In Fig. 2 at the places marked $a$ in the furnaces, passages, and absorbers, are small openings for the purpose of taking the temperature, for instance by means of thermometers or thermo elements, or for measuring the pressure of the gas, or for taking out a portion of the gas for the purposes of analysis, or for other purposes of a similar nature.

The fan H may be, for instance, a Rateau compresser, and is preferably driven by a motor with a constant number of revolutions. This compresser can, if the number of wings be suitably chosen, be made to yield the necessary pressure of, say, up to a few meters of water and maintains the pressure sufficiently constant even if largely varying quantities of air be required. By means of this automatic constancy of pressure each furnace which is supplied with air through the valve I from the common gas supply receives its definite quantity of air even when one of the other furnaces is cut out. The air can either be passed directly into the separate furnaces $F^1$, $F^2$, $F^3$, or it can be previously passed through the gas meter G. If desired, of course, a separate gas meter can be used in connection with each furnace. We have found the fan gas-meters which, allowing for the temperature and pressure of the gas, are able to measure accurately the large quantities of air used, for instance up to a few thousand cubic meters per hour, to be particularly suitable. In order to be able to read off the quantity of air passing at any moment, the tubes are provided with differential manometers. For this purpose a narrow tube, or disk with one or more holes, is inserted into the tube through which the gas passes, whereupon a larger or smaller loss of pressure, varying with the velocity of the air takes place, and this loss of pressure is read off on the differential manometers, which are placed in a sloping position, for instance at a slope of 1:10, so that an alteration of pressure of 1 cm. in the gas tube would cause the indicating thread of liquid to move 10 cm. These differential manometers have been previously compared with the fan gas-meters, so that from the position of the indicating thread of liquid the quantity of air passing at any instant can be read off. The valves I allow the quantity of air passing through any furnace to be suitably regulated.

Figs. 2, 3, and 4 illustrate a single phase furnace for use in carrying out our process. The furnace rests on two strong iron rails 10 which are supported by brick pillars 11. The under part of the furnace, carrying the insulated electrode 25, reaches down to the floor, and immediately under the furnace is a large opening in the floor so that the long iron rods 5 which are used as the wearing part of the electrodes can be supported and insulated without coming into contact with the earth. The outside wall of the furnace consists of an iron covering 12 made up of several tubes, or rings, flanged together. This contains a very thick lining of material (diatomite 13) which conducts heat badly, and this is lined in turn with a fireproof material (chamotte 14). In the fireproof material are a number of passages 3 which at the lower end lead into a larger common passage 16 which has a side-opening out of the furnace. 36 is an opening through which test-portions of the gas can be removed for the purpose of analysis. In the center of the furnace are two concentric iron tubes 1 and 2 with a sufficient space between them and also between the outer tube 2 and the chamotte 14. 1 is the arc tube proper, and can be made either cylindrical or conical, and on the top thereof is a more or less long cylindrical or conical cooler 8. The gas entering the furnace passes first of all upward between the chamotte 14 and the tube 2, thereby taking up heat to a small extent from the hot gases passing down the passages 3. At a short distance below the cooler 8 the gases pass into the space between tubes 2 and 1, traveling downward, cooling the arc tube 1 and at the same time acquiring a temperature of several hundred degrees. This pre-heating varies considerably according to the thickness of the chamotte and iron tubes, the size of the intermediate spaces, the length of the furnace, the quantity of air used, and the method of working. In order to obtain good yields, pre-heating should not generally be under 300° C. and upon the other hand should not be above 700° C., since otherwise the furnace suffers. Into the lower end of this space, for instance, through the opening 17, is inserted a thermo element for the purpose of ascertaining the temperature at any time. The preheated gas is then passed with tangential, or rotating, motion into the space between the arc tube 1 and the insulated electrode 25. Since the strength of the rotatory motion of the current of air plays a great part in the proper production of the arc, special value is laid on the construction of the tangential openings 15. In the aforementioned Letters Patent No. 930,238 these openings are shown in the form of shell-shaped projections. In order to be able to vary the strength of the rotary motion while the quantity of air remains constant, an arrangement is provided with shutters and levers so that the openings can be opened or closed to any desired extent. A still better and easier method of varying the rotary velocity is to make use of a thick cylinder, for instance of cast iron, which is provided with a large number of tangentially bored holes 15. Inside these holes is an iron ring or cylinder 18 which can be moved up or down from the outside by means of a lever 4 so that according to the position of the said lever a number of the tangential bore-holes 15 are closed. When many of the holes are thus closed, and the same quantity of air is used, the velocity in each of the holes remaining open is increased and consequently a stronger rotary motion is produced in the arc tube. The course of the air is indicated in Fig. 3 by arrows. If desired, additional air can be passed into the arc tube 1 at points other than through the tangential openings 15 shown. The electrode 25 in the under end of the arc tube 1 is preferably one such as is described in the specification of our application for Letters Patent Serial No. 469,586, filed December 28, 1908, and reaches to a position slightly above the openings 15 through which the gas enters. It consists of an iron rod inclosed in a cylindrical cooling jacket and is cooled by means of air, oil, or water. For this purpose the cylindrical cooling jacket, for instance of copper, surrounds the iron rod so that when water is used as a cooling agent the rod itself is either surrounded by water or is in intimate connection with a surface which is itself cooled with water. Since, when the furnace is working, there is a tension of several thousand volts between the electrode and the earth, care must be taken to prevent large quantities of the current going directly to earth through the cooling water, consequently as pure water as possible should be supplied to and removed from the cooling cylinder through the openings 22, 23, respectively by means of long india rubber tubes, since the purer the water the greater is its resistance. The tip of the iron rod 5 melts when the furnace is working and care should be taken that the melted end does not flow away. This can be provided for by making the cooler conical, thus forming a space in which the molten iron and any iron oxid formed are retained. A peep-hole 19 is provided just above the end of the electrode for the purpose of looking at the electrode at any time and ascertaining the rate at which it is burning away. The iron rod 5 burns away slowly and apparatus is provided for advancing this rod without stopping operations. This consists of a spindle 6 connected to a wheel 20, upon turning which an insulated plate presses the iron rod upward. The lower end of the iron rod 5 is threaded so that when the greater part of this rod has been used up a fresh rod can be screwed on to it. In order to start the furnace in cases where a spark will not spring of its own accord between the insulated electrode 25 and the arc tube 1, a movable rod 21 attached to a lever 7 is provided so that the said electrode and tube can be short circuited. The one end of the arc thus formed is immediately carried by means of the current of air to the upper end of the arc tube or to a cooler above it so that the greater part of the arc at once burns comparatively quietly in the axis of the arc tube. During the short circuit a large inductive or ohmic resistance should preferably be inserted in the circuit in order to avoid disturbances in the dynamo and in the other furnaces fed by the dynamo. After the arc has been formed a great part of this resistance can be cut out of the circuit. Instead of using a direct short circuit, the formation of the arc can be caused to take place by making the layer of air between the electrode and the tube a conductor of electricity, for instance, it can be heated by means of a flame, or electric sparks can be caused to pass through it, or it can be treated with ionizing rays. Since during the formation of the arc there is a rush of electricity above that which normally passes when the long arc is burning quietly, and since the longer the arc formed in the first instant the greater will be the resistance to this rush, we prefer to make, as long as conveniently possible, the distance which is short circuited between the electrode 25 and the portion connected with the other pole of electricity, so that the arc formed is, say, at least 20 cm. long. The hole through which the rod 21 enters and also the peep-hole 19 should have as small openings as possible into the center tube so that the whirling motion of the air is disturbed as little as possible. When the long arc has been formed it should preferably be made to end on a strongly cooled surface, since if the surface is only slightly cooled it is very much more easily destroyed, consequently the size of the tube, the quantity of the air, and the strength of the rotary motion thereof are so arranged that at least the greater part of the arc ends on the cooler which forms the continuation of the arc tube. It is preferred to use a cooler of the form shown at 8 in Fig. 2. In this, the cooling surface is cylindrical or conical and it can be made of any suitable metal, in particular wrought iron, cast iron, and copper. Water is supplied to this cooler 8 through the pipe 24 and leaves through the pipe 26. It is sometimes advantageous to provide a cooled second electrode 9 immediately opposite the opening of the metal cooler and so arranged that the arc ends partly on it. 34 and 35 are entry and exit openings for water which cools the electrode 9. If this electrode 9 be omitted and the cooler 8 be too short, it can easily happen that the end of the arc is completely carried away by the gases out of the cooler, and the arc ceases and has to be reformed as above described. When the second electrode 9, however, is present, the arc ends partly on it and the carrying away of the arc is more easily avoided; in this way more stable arcs are obtained while still permitting the employment of a small inductive resistance. Experiments have shown, however, that it is not advantageous for the whole or indeed the greater part of the current to pass through the second electrode, since the yield of oxids of nitrogen then diminishes. Consequently an amperemeter is placed in connection between the second electrode and the earth so that at any time the fraction of the total current passing through this second electrode can be ascertained. By altering the quantity of the air and the strength of the rotary motion thereof, it is possible to cause more or less current to pass through the second electrode and consequently to make the furnace work at its best under the conditions existing at the time. If sufficiently large dynamos and inductive resistance can be used, or if a sufficiently long cooler be used, it is not necessary to employ a second electrode. The furnace lasts longer if the whole upper plate be formed of one cooled metallic surface. This is shown clearly in Fig. 7, in which the top of the furnace is covered with a box-shaped vessel 32 fed with water from the pipe 26 and provided with an exit 33. The cooler 8 should preferably be so chosen and arranged that the gases coming from the arc tube are cooled on an average to about 1200° C. These gases then pass through the tubes 3, giving up a part of their heat to the air which is passing into the furnace.

Figure 5:
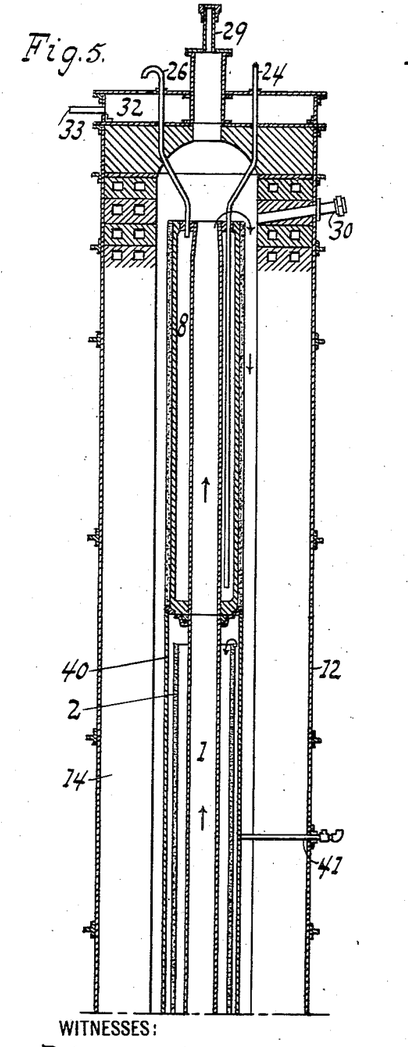
Figs. 5, $5^a$, 6 and $6^a$ are other arrangements of the furnace in vertical section. Fig. $6^b$ is a horizontal section of Figs. 6 and $6^a$ along the line $a\ b$.
Figure 5A:
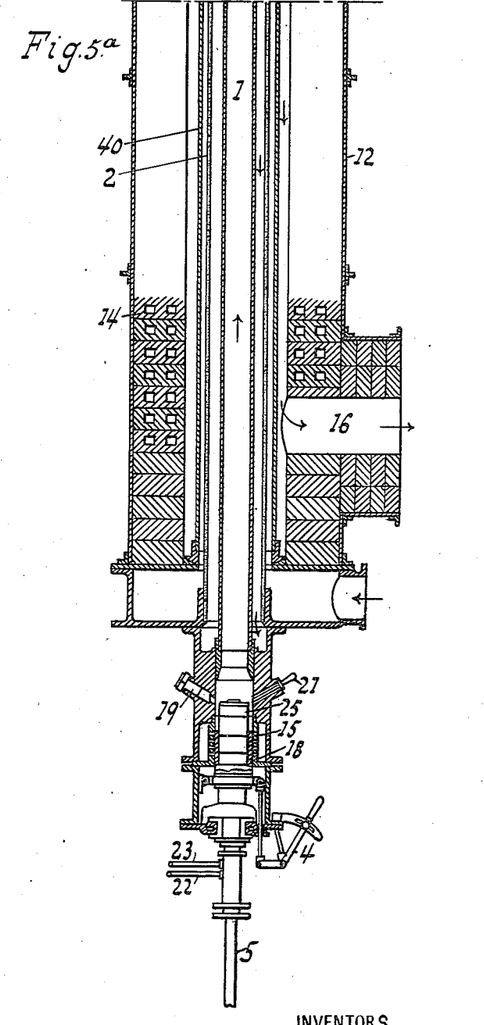
Figures 6, 6A, 6B:
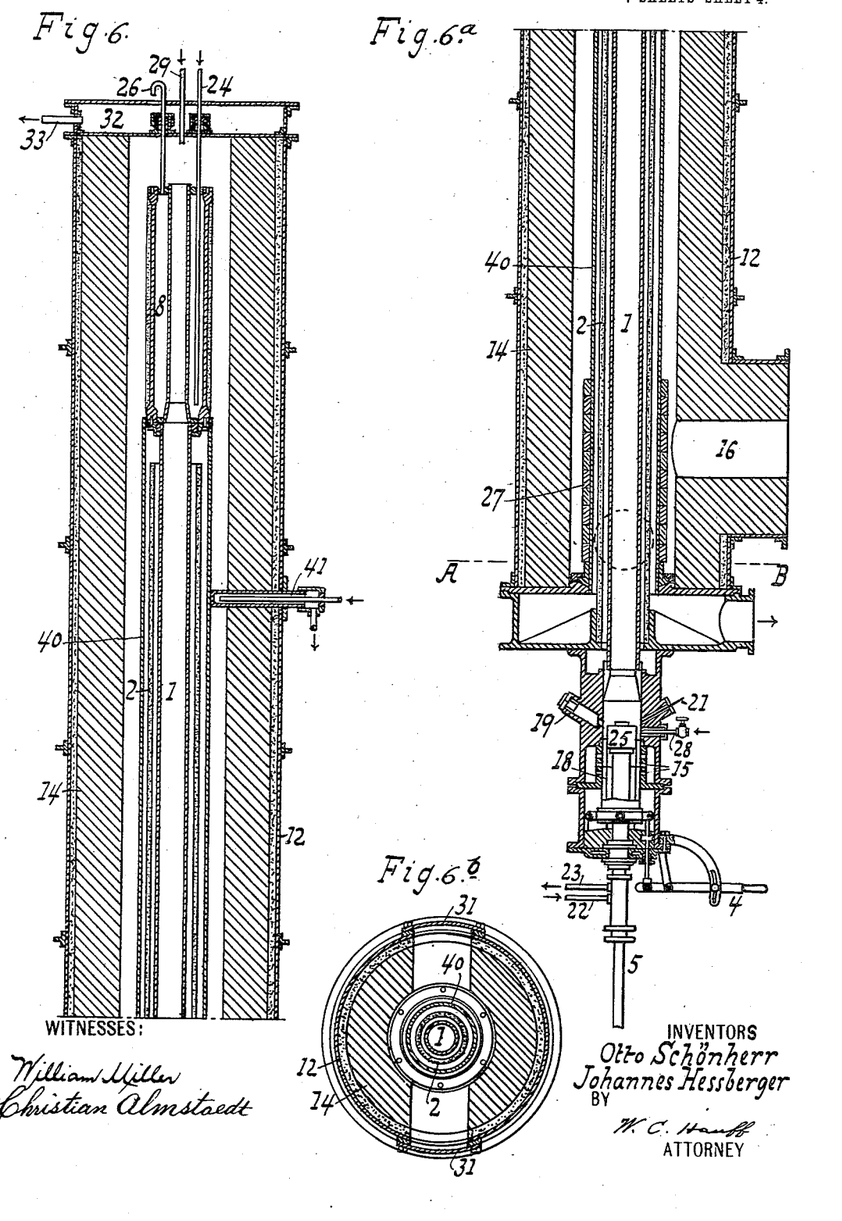
Figure 7:
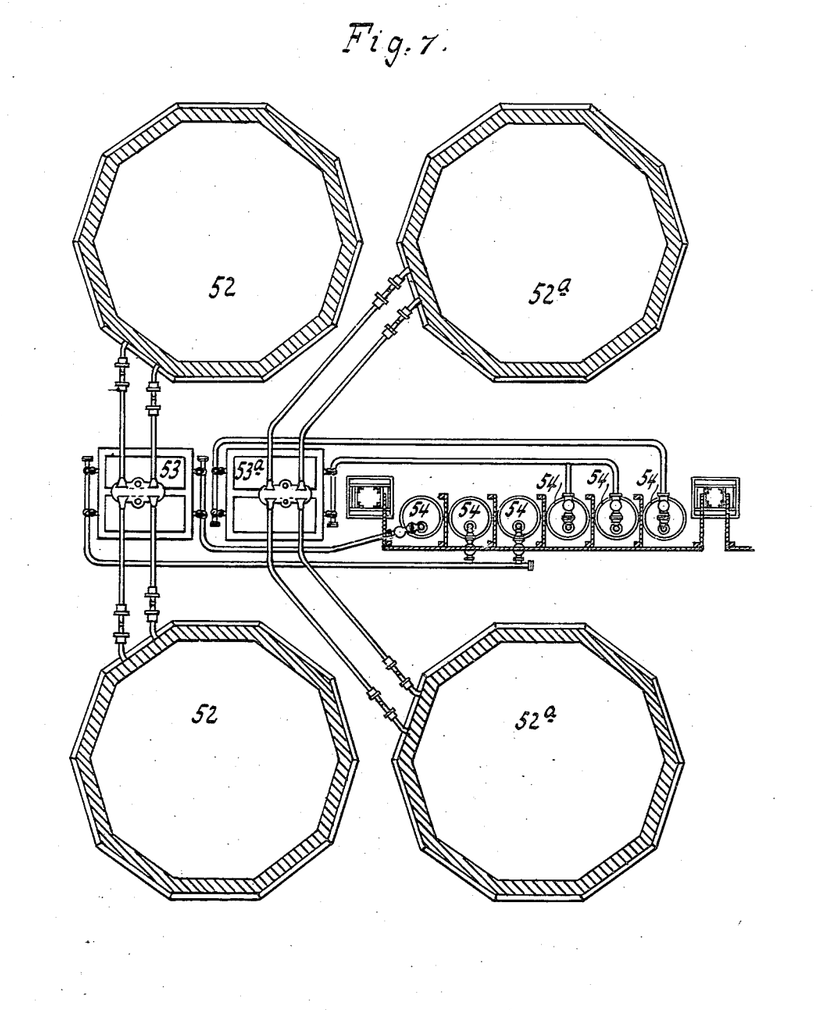
Figs. 7 and $7^a$ are plans illustrating the general arrangement of granite towers, acid eggs, reservoirs, and circulation of absorbing liquid.
Figure 7A:
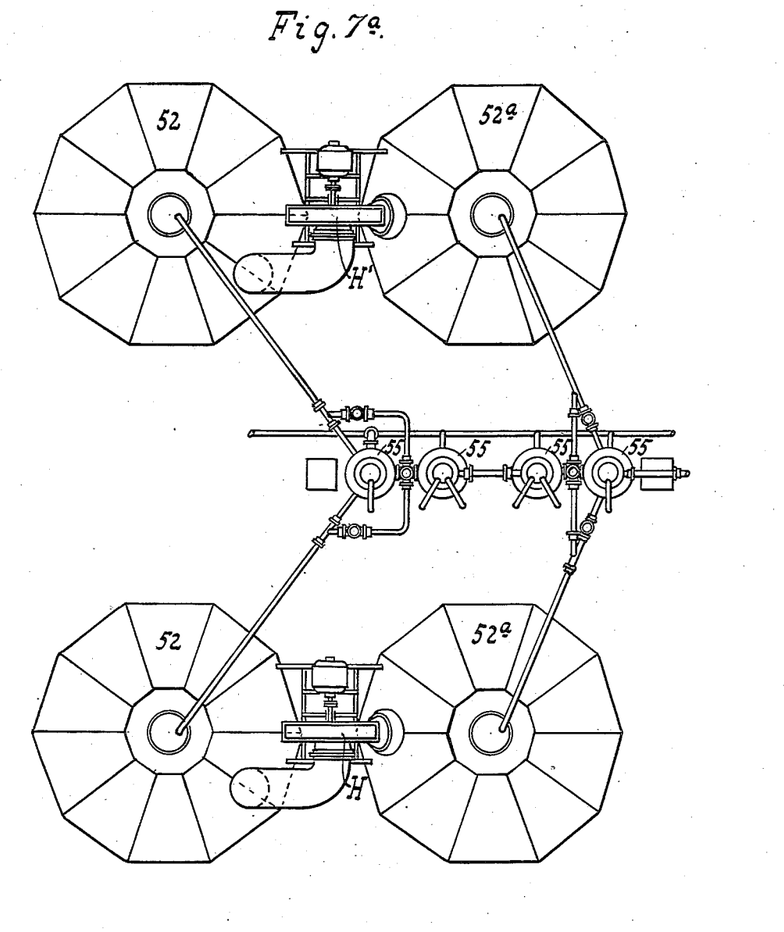

Figs. 5 5ª, 6 and 6ª show modifications of the furnace in which there is no special second electrode, but the cooler 8 is made considerably longer than is shown in Fig. 2. Moreover in the furnaces illustrated in these figures the chamotte tube 14 has no holes through which the treated gases pass, but each furnace is provided with a strong iron tube 40 which is kept in a central position inside the chamotte tube 14 by means of three bolts 41 which are cooled with water as shown in Fig. 7, since they are subjected to a great heat. This tube 40 is well supported at its lower end and carries the cooler 8 at its upper end, while from the cooler are suspended the actual arc tube 1 and the tube 2 which in Fig. 7 consists of a double sheet of metal packed with non-conducting material such as asbestos. The cooler 8 is fed with cold water which enters through the pipe 24 and leaves through the pipe 26. The tube 40 can, if desired, in order to prevent too much heat passing from the gases leaving the apparatus to those entering it, be covered with a number of fire-proof rings 27, for instance, of chamotte, and the number can be varied at will. In Figs. 5 and 5ª the chamotte tube 14 is shown made up of bricks containing non-communicating air spaces for the purpose of better preventing loss of heat through this layer and also for reducing the weight of the furnace. In Figs. 6 and 6ª, 28 represents an entrance through which air can be supplied to the inner tube, if it be desired to introduce more air than is passing in through the tangential openings 15.

In Figs. 5, 5ª, 6 and 6ª, 29 represents a peephole in the axis of the arc so that it is possible to look down the cooler and see that the arc ends in the cooler. When the furnace is working correctly, the end of the arc will be seen to travel in a circle and the arc itself also continually varies in length, but with ordinary precautions the end of the arc can always be kept inside the cooler and the movements both circular and up and down of the end of the arc are advantageous, since if the arc always ended at the same point of the cooler, that point would probably become too hot and suffer, although the other surface of the metal is in contact with a cooling fluid. In Figs. 5 and 5ª a second peep-hole is shown at 30 for the purpose of determining whether the arc is passing out at the end of the cooler; by the use of a red glass the observation is made easier, as it cuts off nearly all the light except that of the arc, if it be showing. The inner tube of the cooler should be easily replaceable. We prefer, therefore, to employ a tube, say, of copper and roll the ends into the remaining parts of the cooler. Fig. 6ᵇ shows how part of the chamotte tube 14 is omitted below the exit 16 for the gases, the spaces left being covered with iron plates 31, which can be removed for cleaning purposes.

Separate parts of the furnace can be formed in any suitable manner, for instance, the arc tube can be made cylindrical or conical, and it can be cooled either by means of air as above described or it can be wholly or partly cooled by means of water. Instead of metal, it can be made of fire-proof material provided means are present for starting the arc. Specially cooled tubes can be passed into the arc tube with their ends in the largest part of the arc so that by their means the gases richest in oxids of nitrogen can be taken directly from the arc flame. The gases can also be led through narrow tubes, in which case also a sudden cooling is effected on account of the increase of velocity. The dimensions of the tube can be varied within wide limits and depend largely on the conditions of working. When a high voltage is used, in general a longer tube must be used. However, high voltage can be employed in connection with a short tube if the tube is made conical or a larger quantity of air is employed or the rotary motion of the air is decreased.

Referring again to Fig. 1, the gases leaving the furnace at a temperature of about 1000° C. pass into a passage N consisting of an iron-plate wall lined with fire-proof material. This passage can very easily become unsound, especially when work is not continuous, on account of the alterations of temperature, and the consequent expansion and contraction of the materials used, and it is preferred not to fasten the iron tube and the fire-proof material together, but to separate them by a layer of asbestos, and also to insert at convenient places spring compensators, so that the expansion can be easily taken up. It is, however, difficult to maintain the passage and the valves entirely gas-proof, consequently we prefer to maintain the gases in the passage at atmospheric pressure, and for this purpose we employ fans H, and so prevent the nitrous gases on the one hand from escaping and on the other hand from being further diluted with air. The gases pass from the passage N to the boiler L which can be built in any desired manner, but should preferably be arranged so that the surfaces with which the gases come into contact can be easily cleaned, since the nitrous gases continually carry over small quantities of burnt electrode, for instance $Fe_3O_4$, and these are deposited in the passages and on the heating surfaces of the boiler, and if not removed tend to prevent the transference of heat from the gases to the boiler. The gases leave the boiler at a temperature of about 300° C., while the pressure in the boiler reaches several atmospheres, and the steam can be employed for driving steam engines which are employed in the factory. The steam is also used for concentrating the acid and salt solutions obtained by the further working up of the nitrous gases hereinafter described. The evaporating apparatus is preferably so arranged that the condensed water is returned to the boiler as is shown in Fig. 1 $M^1$, $M^2$, $M^3$, as it is then unnecessary to feed fresh water into the boiler and also the formation of deposits in the boilers is reduced to a minimum. If a sufficient quantity of steam can be obtained, open pans are used, steam coils passing through the liquid contained in them. The solution to be evaporated should be passed continuously through the pans, it thus attains a certain concentration in the first pan, runs into the second, where it is still further concentrated, and passes into the third, and so on until in the last pan it reaches such a concentration that in the case of a salt solution, e. g. of sodium nitrate, it can be passed into large cooling tanks for crystallization. Vacuum apparatus for evaporating is employed if only small quantities of steam are available or if a high temperature be necessary at ordinary pressure. Two or more of these can be attached in series and it is possible to evaporate larger quantities of liquid with the same quantity of steam. The nitrous gases leaving the boiler L at about 300° C. pass along an iron tube O which is surrounded by a second tube O'. The tube O' contains baffle plates so that the air coming into contact with the hot tube O is frequently renewed and a large quantity of air at high temperature obtained. This can be used for heating and drying purposes, for instance for evaporating dilute nitric acid up to a concentration of 60% or for drying the slats obtained, for instance, sodium nitrite. For the latter purpose drying rooms P, P¹, P² are provided in which the salt is spread out in large areas of comparatively small depth and the air is led in so that it passes over each surface. Instead of these drying rooms, mechanical drying tubes can be employed in which the damp salt and the hot air continually meet one another, and the salt leaves the end of the tube in a dry condition, if necessary falling directly into the casks ready for packing. The hot air is finally led to a chimney Q and thus assists in creating a draft. The nitrous gases pass from the tube O, or in case such a tube is not employed directly from the boiler, into coolers R in which they are brought to as low a temperature as possible, at least to 80° C. These coolers R consist preferably of a large number of parallel tubes which are sprinkled with water. We have found aluminium to be a very suitable material for the tubes, since it is at the most only very slowly attacked by the nitrous gases. After leaving the cooler, R, the gases pass into a so-called oxidation chamber S where the nitric oxid formed in the furnaces is wholly or partly oxidized into higher oxids, for instance according to the equations $$2NO+O=N_2O_3$$

and $$2NO+O_2=2NO_2=N_2O_4.$$

When this oxidation chamber S is used, the absorption takes place more readily in the absorbers A C to which the gases now pass. If the absorbers, however, are sufficiently large the oxidation chamber can be dispensed with. If it is desired to produce nitrites in the absorbers, these are charged with strong sodium carbonate solution and in this case the oxidation chamber should either be entirely omitted, or should be so small, that the oxidation only takes place till the stage corresponding to the formula $N_2O_3$ is reached, since otherwise instead of nitrites considerable quantities of nitrates are obtained. If the cooler in front of the absorption system be omitted, the absorption in the first absorber can take place while hot, but the solution used in this absorber must then be cooled. Any suitable absorption apparatus can be employed, such for instance as absorbing towers, or apparatus in which gases are bubbled through liquid, and the absorption can be carried out with solid material, for instance, lime, or with liquids, such as alkaline solutions, water, and acid. If it is desired to produce nitric acid, absorption towers 52 are preferably employed, the towers being made of acid-proof material, such as sandstone or granite, and being filled with acid-proof filling. The contents of the tower should present as large a surface as possible to the gases and we prefer to use quartz in coarse lumps of about 1 inch in diameter. On the other hand the tower must also contain spaces so that the nitric oxid which is formed during the absorption according to the equation $$3NO_2+H_2O=2HNO_3+NO$$

can be oxidized to the higher oxids; such spaces can be formed by means of cylinders or brickwork of acid-proof material. Since the gases only contain a small proportion, say from 2–3%, per volume of nitric oxid, exceptionally large towers are necessary, for instance 30 square meters in area and 20 m. in height.

Figure 8:
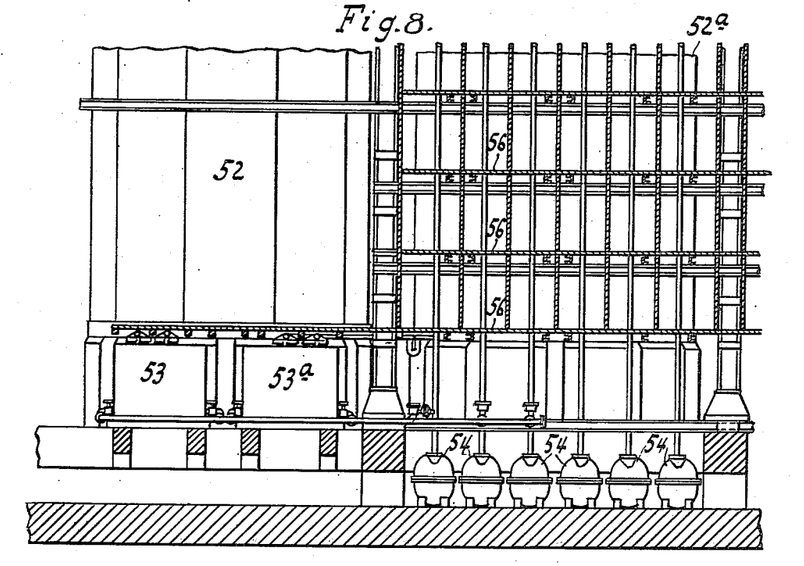
Figs. 8 and $8^a$ represent elevations of the same, partly in section.
Figure 8A:
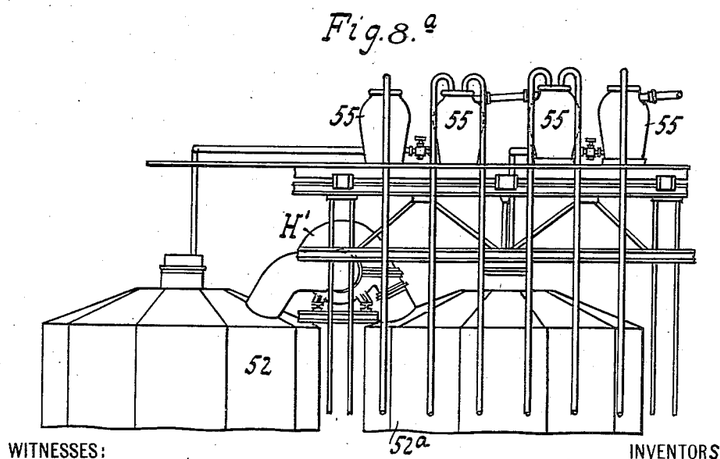

Figs. 7 and 7ᵃ represent plans at the bottom and at the top respectively of a system of towers, acid eggs, and reservoirs for use in treating the gases with absorbing liquids. Figs. 8 and 8ᵃ represent elevations partly in section of the lower and upper portions of this system. In these figures 52, 52ᵃ represent towers made of granite plates fastened together by means of iron bands and also supported in such a manner that all the joints are visible and can easily be attended to if necessary; the joints are preferably made in a manner hereinafter to be described in detail. The iron bands are protected from rust and from being attacked by the acid fumes by being coated while hot with high-boiling petroleum residue, or other acid-proof paint. The absorption is carried out on the counter-current system, i. e., the tower through which the gases pass last of all is treated with very dilute acid or with water, while the first tower into which the gases pass is fed with acid which has already been employed for absorbing the acid vapors from weaker gases. We prefer to employ four towers in series and to allow three-fourths of the acid leaving one tower to pass again through that tower, while the remaining one-fourth is passed through the next tower, where it comes into contact with gases containing a higher percentage of oxids of nitrogen. The liquid fed into the last tower through which the gases pass consists of three parts of dilute acid taken from the bottom of that tower and one part of water. One-fourth of the acid leaving the first tower through which the gases pass is worked up for nitric acid, or nitrates, in any convenient manner. In this tower the acid is brought up to a concentration of from 300–400 gr. nitric acid per liter. Although it is possible to obtain 60% acid by absorption, it is in most cases, for instance in the production of nitrates, not advantageous to produce concentrated acid, since the absorption is then not complete. Of course each of the four towers may be duplicated and thus two series each of four towers be employed, while making use of only one set of reservoirs and acid eggs. In Figs. 7, 7$^a$, 8 and 8$^a$, the first two towers of two such series are shown. The towers 52 are in parallel and the acid from each flows into the reservoir 53 while the towers 52$^a$, 52$^a$, are also in parallel and the acid from each flows into the reservoir 53$^a$, from these reservoirs the acid then flows into acid eggs 54, and is raised by means of these into reservoirs 55 above the towers, care being taken of course that the acid is apportioned in the right manner. The exits for the liquid from the towers and reservoirs should be so arranged that the liquid is visible, and any irregularity in the flow can be at once noticed and rectified. The gases pass up one tower and down the next and fans H' are used to promote circulation through the system. The acid eggs 54 should of course be acid-proof and can either consist of granite or of stoneware or can consist of iron vessels lined with stoneware so that the acid does not come into contact with the iron, and they are preferably made to work automatically. They must of course be strong enough to withstand the pressure necessary to raise the liquid to the upper reservoirs 55. The connecting pipes for conveying the acid to and from the reservoirs and acid eggs should preferably be so arranged that some at least of the said reservoirs and acid eggs can be used interchangeably, so that if for any reason one or more of them should be unusable, the absorption need not be broken off. Since the towers are high, the connecting pipes are subjected to a considerable pressure and should be frequently examined to see that they are in order. For this purpose it is advantageous to maintain a series of platforms as shown at 56 in Fig. 8 and these can be nearer together at the bottom and farther apart up above where the long vertical connecting pipes are less liable to become unsound. The said long vertical connecting pipes which are preferably made up of sections should be so arranged that one section can be taken out and replaced without it being necessary to dismount the whole column, and this can be effected by making the upper, or the lower, end, or both ends, movable in a vertical direction. The connecting pipes should also be arranged that they can to some extent contract and expand and so accommodate themselves to a change of temperature without becoming strained. The absorbing liquid flows into the towers through a number of openings and any suitable apparatus can be used for making the distribution as equal as possible over the whole surface. If desired, the gases may be passed through an additional apparatus after the last tower of each series for the purpose of washing them with water and thus preventing any nitric acid mist from being carried away. Instead of four absorption towers in each series for producing acid, a larger or smaller number can be employed, for instance in Fig. 1 only two are illustrated. As hereinbefore stated, granite towers are used for the absorption by acids, the granite plates should be so supported that all the joints are visible, this applies for instance to the floor in which each plate is supported on a pillar, while the joint between two plates is not supported, and should any joint leak, the said acid can be caught in a suitable receptacle, if it is not convenient to attend to the joint at once. Since the absorbing towers are large we prefer to have a hanging railway running around the tops of the towers, so that a cage or platform hanging therefrom can be brought into a position for allowing of the repairing of any joint which may be leaking or otherwise require attention. In this way, the erection of extensive scaffolding is rendered unnecessary. The gases after leaving the acid absorbers or the apparatus employed for washing the said gases with water, may be passed into alkaline absorbing towers containing alkalis, such as milk of lime, or a carbonate, for instance sodium carbonate. In these towers nitrates are formed for the most part, the absorption taking place according to the equation $$Na_2CO_3 + NO + NO_2 = 2NaNO_2 + CO_2.$$

Since the gases leaving the last acid absorbing tower contain practically only nitric oxid, we prefer to pass them through an oxidation chamber before they enter the alkaline absorbing tower, the said chamber being so large that about one-half of the nitrous oxid is converted into nitrogen tetroxid. The alkaline absorbing towers are of wood or iron, and the liquid must be supplied in large quantities so that all parts remain alkaline, since otherwise the material could be injured, or acid and nitrates could be formed instead of nitrites. The alkaline liquids are preferably raised by means of metal pumps instead of acid eggs since the former require less attention and are capable of handling large quantities of liquid. We prefer to employ two alkaline absorbing towers and to supply the second one with stronger alkaline solution which absorbs the very dilute gases well. Instead of alkali, sulfuric acid can be used for absorbing the most dilute gases, and the nitrosylsulfuric acid formed, on treatment with water, or on being heated, gives off nitrous gases which are preferably led into the first acid absorbing tower. The motion of the gases in the absorbing system is brought about by means of fans which are set up at convenient places, for instance where the pipes conveying the gases approach the ground. We prefer the fans to produce a small negative pressure at all points of the absorbing system, and this can easily be brought about since the fans are driven by motors the speed of which can be regulated. The negative pressure can also be prevented from becoming too great by means of automatic valves in the tubes. We prefer to make use of fans consisting of aluminium wings rotating in granite casings, and the axles may be either horizontal or vertical. If the furnaces are fed with air, the gases coming out of the absorber are allowed to escape; if, however, the air supplied to the furnaces is enriched with oxygen, the gases leaving the absorber are returned to the furnaces after being enriched with nitrogen and oxygen in the same proportion as they were removed by the absorption, i. e. by acid obsorption in the proportion 5:2, or by alkaline absorption in the proportion of 3:2, or when both methods of absorption have been employed in a proportion lying between these extremes. When sodium nitrite is being produced in the alkaline towers, these latter are fed with a very concentrated solution of sodium carbonate and this solution is run several times through the towers and is enriched from time to time by the addition of fresh sodium carbonate. When the solution is saturated with nitrous acid to such a degree that it contains only from 1–1.15% of sodium carbonate or sodium bicarbonate, the solution if brought into evaporating apparatus and concentrated until, upon cooling, nitrite separates out, while all the carbonate remains in the mother liquor which is used again for absorbing the nitrous gases. If desired, sodium carbonate and sodium nitrite can be separated from one another by evaporating the solution of the two compounds until it reaches about 130° C., whereupon only small quantities of nitrite, but the greater part of the sodium carbonate separates out while hot, whereas upon cooling, especially if a little water be added to the solution, pure sodium nitrite separates out. The salt which separates out while hot, consisting for the chief part of sodium carbonate, is used for the production of fresh absorbing liquid. Nitrites which are not used as such are treated with nitric acid and converted into nitrates, the nitrous acid gases evolved being passed into the acid absorption tower either directly or after being mixed with the necessary quantity of air to form higher oxids of nitrogen. The 30–40% nitric acid is used either for the production of nitrates or concentrated nitric acid. The nitrates are obtained most easily by neutralizing the nitric acid by hydroxids or carbonates. The production of calcium nitrate is especially important as it can be used in large quantities as artificial manure and the calcium required can easily be obtained from common limestone. The calcium nitrate is prepared by allowing the nitric acid to flow through granite tanks containing limestone, making use of the countercurrent principle. The limestone is used in pieces of about 6 inches in diameter, since if smaller pieces be used too much frothing occurs, which is also the case if an acid stronger than 30% be employed. The tanks are fitted with tower-shaped tops which are also filled with limestone and serve to take up any frothing. The limestone absorbs about 95% of the acid, while for the last 5% slaked lime is necessary. The calcium nitrate solution is evaporated in vacuum apparatus, such for instance as that of Kestner, until it contains 13–13.5% nitrogen. It is then brought by means of hot acid eggs into drying pans in which it solidifies in from one to two days. The solidified mass is broken up into pieces and ground till it is obtained in pieces about one-quarter of an inch in diameter. Any very finely divided calcium nitrate obtained is separated and returned to the solidifying tanks. Instead of calcium nitrate, other nitrates can be produced from their carbonates, such for instance as nitrates of lead, manganese, barium, strontium, and magnesium, or mixtures of nitrates can be obtained, as by the use of dolomite as the absorbing agent. The 30–40% nitric acid can also be used for working up other minerals such for instance as phosphates, silicates, borates, molybdates, tungstates, and sulfur compounds. In such cases other valuable compounds are obtained as well as the nitrates. In particular the phosphates obtained from bones can be treated with nitric acid instead of with sulfuric acid as has hitherto been the practice. In this case instead of valueless calcium sulfate, valuable calcium nitrate is obtained. Such mixtures of soluble phosphates and nitrates have, however, the disadvantage that upon evaporation of their solutions nitric acid is evolved and the insoluble phosphate is reformed, consequently we prefer to treat such solutions with an excess of highly dehydrated calcium nitrate, whereupon a paste is obtained which slowly solidifies. Or, we can employ only such a quantity of nitric acid that a phosphate is obtained which is insoluble in water, but is soluble in citrate solutions, or any excess of acid beyond this can be neutralized by means of lime and this product can then be mixed with more calcium nitrate, or after separation of the calcium nitrate solution the citrate-soluble phosphate can be treated with sulfuric acid and thus converted into the phosphate which is soluble in water. When working according to the latter method only half the quantity of sulfuric acid is required of that which would be necessary if the phosphate were originally treated with sulfuric acid. The boric acid minerals, which also contain the elements of lime, magnesia, sodium oxid, or other oxids, can also be treated with nitric acid, whereupon the greater part of the boric acid separates out while the nitrates are retained in solution. The small quantity of boric acid which goes into solution can be precipitated by means of alkali, for instance milk of lime, the precipitate being worked up again with a fresh quantity of the original mineral. The solid boric acid obtained can be purified by crystallization or it can be converted into borax by means of sodium carbonate solution.

Many of the natural silicates can be worked up by means of nitric acid, in particular when leucite is thus treated, solid silicic acid is obtained in a state of great purity, while potassium nitrate and aluminium nitrate are obtained in solution. On evaporating this solution pure potassium nitrate separates out and the aluminium nitrate can be worked up for aluminium hydroxid either by precipitating with milk of lime or by heating the aluminium nitrate solution to about 150° C., whereupon nitrous gases are evolved and at first basic nitrate and subsequently aluminium hydroxid or oxid separates out. The nitrous gases are used again for preparing nitric acid and are preferably passed into the acid obsorbing towers hereinbefore described. The production of ammonium nitrate can be easily effected by neutralizing the nitric acid with ammonia solution or with ammonium carbonate. Other compounds of nitrogen and oxygen can be obtained, for instance nitrogen tetroxid can be produced by converting the nitric acid into lead nitrate which upon being heated yields lead oxid and nitrogen tetroxid. This latter can be easily liquefied. If the furnace gases be directly compressed or very strongly cooled the compounds of nitrogen and oxygen contained therein can be directly obtained in a liquid or solid state. Nitrogen pentoxid can be obtained by treating the nitrous gases with oxone and the gases containing nitrogen pentoxid or nitric acid vapor can be absorbed by concentrated sulfuric acid and valuable nitrating acid thus be obtained.

Since the production by means of absorption of acid containing more than 40% of pure nitric acid presents difficulties, we prefer to obtain concentrated acid, for instance, by evaporating the weaker acid until it contains above 60% of acid and then to mix this with compounds which take up the water, for instance, calcium nitrate, sulfuric acid, and polysulfates. On distilling such a mixture, an acid containing nearly 100% of pure acid can be obtained, and for these operations the heat produced by the furnaces is made use of. We can also concentrate the dilute nitric acid by means of Brulfer's system, in which the gases leaving the furnace are made to heat a vessel containing a mixture of concentrated sulfuric acid and 60% nitric acid, whereupon a 95% nitric acid distills off. The gases are then passed through a tower which is fed with nitric acid obtained from the acid absorbing towers and they take the greater part of the water from this acid so that a 60% acid remains behind. The gases now contain some nitric acid vapor and this is condensed together with the other nitrogen-oxygen compounds in the absorbers to which the gases pass. The concentration of the sulfuric acid which has been used to dehydrate the nitric acid can also be effected by means of the heat produced in the furnaces. The heat contained by the gases leaving the furnace can also be used in other processes which are carried out in connection with the production of nitric acid, for instance it can be used for the production of barium peroxid by heating barium nitrate produced in the manner above described, and the heating can take place either in crucibles or in retorts heated from the outside, or the furnace gases can be passed directly over the barium nitrate, whereupon nitrous gases are given off by the barium nitrate and are passed along to the absorber. The heat evolved in the furnace can also be used for heating limestone and thus producing the lime which is used in the aforementioned processes.

The furnaces themselves can be directly built in a steam boiler, so that large quantities of steam at high pressure can be obtained, and they can be placed horizontally, since the arc will also burn in a horizontal as well as in a vertical position.

Now what we claim is:

1. In an apparatus for manufacturing compounds containing nitrogen in combination a furnace containing an insulated electrode connected with a source of electricity, means for starting an arc in the furnace, means for supplying a current of air with rotary motion to the furnace, means for cooling the gases which leave the furnace, an oxidation chamber, and means for absorbing the oxids of nitrogen contained in the said gases.

2. In an apparatus for manufacturing compounds containing nitrogen in combination a furnace containing an insulated electrode connected with a source of electricity, means for supplying a current of air to the furnace, means for cooling the gases which leave the furnace, an oxidation chamber, and means for absorbing the oxids of nitrogen contained in the said gases.

3. In an apparatus for manufacturing compounds containing nitrogen in combination a furnace containing an insulated electrode connected with a source of electricity, means for supplying a current of air with rotary motion to the furnace, means for cooling the gases which leave the furnace, an oxidation chamber, and means for absorbing the oxids of nitrogen contained in the said gases.

4. In an apparatus for manufacturing compounds containing nitrogen in combination a furnace containing an insulated electrode connected with a source of electricity, means for supplying a current of air with rotary motion to the furnace, means for regulating the strength of the rotary motion, means for cooling the gases which leave the furnace, and means for absorbing the oxids of nitrogen contained in the said gases.

5. In an apparatus for manufacturing compounds containing nitrogen in combination a furnace containing an insulated electrode connected with a source of electricity, means for supplying a current of air with rotary motion to the furnace, means for regulating the strength of the rotary motion, and means for absorbing the oxids of nitrogen contained in the gases which leave the furnace.

6. In an apparatus for manufacturing compounds containing nitrogen in combination a furnace containing an insulated electrode connected with a source of electricity, means for supplying a current of air with rotary motion to the furnace, and means for regulating the strength of the rotary motion.

7. In an apparatus for manufacturing compounds containing nitrogen a furnace comprising an arc tube, a surrounding tube, tangential openings from the outer tube to the inner tube, and means for closing a number of said tangential openings.

8. In an apparatus for manufacturing compounds containing nitrogen a furnace comprising an arc tube, a surrounding tube, tangential openings from the outer tube to the inner tube, and a sliding cylinder between the lower end of the inner tube and the outer tube.

9. The process of producing compounds containing nitrogen by passing a current of air with rotary motion into a furnace containing a long stable electric arc, cooling the gases which pass from the furnace, passing them through an oxidizing chamber, treating them first with a non-alkaline absorbing agent, and subsequently with an alkaline absorbing agent.

10. The process of producing compounds containing nitrogen by passing a current of air into a furnace containing a long stable electric arc, cooling the gases which pass from the furnace, passing them through an oxidizing chamber, treating them first with a non-alkaline absorbing agent, and subsequently with an alkaline absorbing agent.

11. The process of producing compounds containing nitrogen by passing a current of air into a furnace containing a long stable electric arc, cooling the gases which pass from the furnace, passing them through an oxidizing chamber, and treating them with a non-alkaline absorbing agent.

12. The process of producing compounds containing nitrogen by passing a current of air with a rotary motion into a furnace containing a long stable electric arc, cooling the gases which pass from the furnace, treating them first with a non-alkaline absorbing agent, and subsequently with an alkaline absorbing agent, then reacting with the nitric acid obtained by use of the non-alkaline absorbing agent on the nitrite obtained by the use of the alkaline absorbing agent, and passing the nitrous gases evolved through an oxidizing chamber, and subsequently treating them with a non-alkaline absorbing agent.

In testimony whereof we have hereunto set our hands in the presence of two subscribing witnesses.

OTTO SCHÖNHERR.
JOHANNES HESSBERGER.

Witnesses:
A. W. ABEL,
JACOB HÓYVALL.